US012572206B2

(12) United States Patent
Wei et al.

(10) Patent No.: US 12,572,206 B2
(45) Date of Patent: Mar. 10, 2026

(54) DETERMINATIONS OF CHARACTERISTICS FROM BIOMETRIC SIGNALS

(71) Applicant: Hewlett-Packard Development Company, L.P., Spring, TX (US)

(72) Inventors: Jishang Wei, Guilford, CT (US); Rafael Ballagas, Palo Alto, CA (US); Keanu Spies, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 351 days.

(21) Appl. No.: 18/043,316

(22) PCT Filed: Sep. 8, 2020

(86) PCT No.: PCT/US2020/049695
§ 371 (c)(1),
(2) Date: Feb. 27, 2023

(87) PCT Pub. No.: WO2022/055475
PCT Pub. Date: Mar. 17, 2022

(65) Prior Publication Data
US 2023/0273682 A1      Aug. 31, 2023

(51) Int. Cl.
G06F 3/01          (2006.01)
G06N 3/0455      (2023.01)

(52) U.S. Cl.
CPC .................................... G06F 3/015 (2013.01)

(58) Field of Classification Search
None
See application file for complete search history.

(56) References Cited

U.S. PATENT DOCUMENTS 6,026,340 A * 2/2000 Corrado ............... B60N 2/0029
                                                        701/47
9,031,293 B2 5/2015 Kalinli-Akbacak
2006/0004680 A1 1/2006 Robarts et al.
(Continued)

FOREIGN PATENT DOCUMENTS

CN          110097934      * 8/2019 ............. G06F 16/25
CN          110569869 A     12/2019
(Continued)

OTHER PUBLICATIONS

F. ZhoU et al , "A Case-Driven Ambient Intelligence System for Elderly in-Home Assistance Applications," in IEEE Transactions on Systems, Man, and Cybernetics, Part C (Applications and Reviews), vol. 41, No. 2, pp. 179-189, Mar. 2011, doi: 10.1109/TSMCC.2010.2052456. keywor (Year: 2011).*
(Continued)

*Primary Examiner* — Beniyam Menberu
(74) *Attorney, Agent, or Firm* — Quarles & Brady LLP

(57)          ABSTRACT

An example system includes a plurality of biometric sensors to generate a plurality of signals. The system includes a feature engine to generate a plurality of feature vectors from the plurality of signals. The system includes a classifier engine to generate a plurality of decision vectors based on the plurality of feature vectors. The system includes an attention engine to weight the plurality of feature vectors and the plurality of decision vectors and determine a characteristic of a user based on the weighted feature and decision vectors.

18 Claims, 6 Drawing Sheets

400

(56) References Cited

U.S. PATENT DOCUMENTS

| | | | | |
|---|---|---|---|---|
| 2014/0031952 A1* | 1/2014 | Harshbarger | ........ | A61B 5/7264 |
| | | | | 623/25 |
| 2016/0022167 A1 | 1/2016 | Simon | | |
| 2016/0101783 A1 | 4/2016 | Abou-Nasr et al. | | |
| 2018/0336466 A1 | 11/2018 | Braun et al. | | |
| 2019/0059763 A1* | 2/2019 | Shakur | ................... | G16H 40/67 |
| 2019/0251707 A1* | 8/2019 | Gupta | ..................... | G06T 9/002 |
| 2020/0124863 A1 | 4/2020 | Lawrence | | |
| 2020/0300970 A1* | 9/2020 | Nguyen | ................. | G01S 13/88 |
| 2023/0277106 A1* | 9/2023 | de Zambotti | ......... | G16H 50/20 |
| | | | | 600/301 |

FOREIGN PATENT DOCUMENTS

| | | | | |
|---|---|---|---|---|
| KR | 20200049930 | * | 5/2020 | .............. A61B 5/00 |
| WO | 2014/209773 A1 | | 12/2014 | |

OTHER PUBLICATIONS

S. Kalamkar et al., "Clinical Data Fusion and Machine Learning Techniques for Smart Healthcare," 2020 International Conference on Industry 4.0 Technology (I4Tech), Pune, India, 2020, pp. 211-216, doi: 10.1109/I4Tech48345.2020.9102706. (Year: 2020).*

Xiong, J., Li, F., Zhao, N. and Jiang, N., 2014. "Tracking and recognition of multiple human targets moving in a wireless pyroelectric infrared sensor network". Sensors, 14(4), pp. 7209-7228. (Year: 2014).*

L. Zhang et al., "Cognitive Load Measurement in a Virtual Reality-Based Driving System for Autism Intervention," in IEEE Transactions on Affective Computing, vol. 8, No. 2, pp. 176-189, Apr. 1-Jun. 2017, doi: 10.1109/TAFFC.2016.2582490. (Year: 2017).*

Zhang, P., Wang, X., Chen, J. and You, W., 2017. Feature weight driven interactive mutual information modeling for heterogeneous bio-signal fusion to estimate mental workload. Sensors, 17(10), p. 2315. (Year: 2017).*

Shu L, Xie J, Yang M, Li Z, Li Z, Liao D, Xu X, Yang X. A Review of Emotion Recognition Using Physiological Signals. Sensors (Basel). Jun. 28, 2018;18(7):2074. doi: 10.3390/s18072074. PMID: 29958457; PMCID: PMC6069143. (Year: 2018).*

Hu, D., et al., "Dense Multimodal Fusion for Hierarchically Joint Representation", IEEE, Apr. 17, 2019, pp. 10.

Vaswani, A. et al., "Attention is all you need", in Advances in neural information processing systems, 2017, pp. 5998-6008.

* cited by examiner

FIG. 3                                                                                                    300

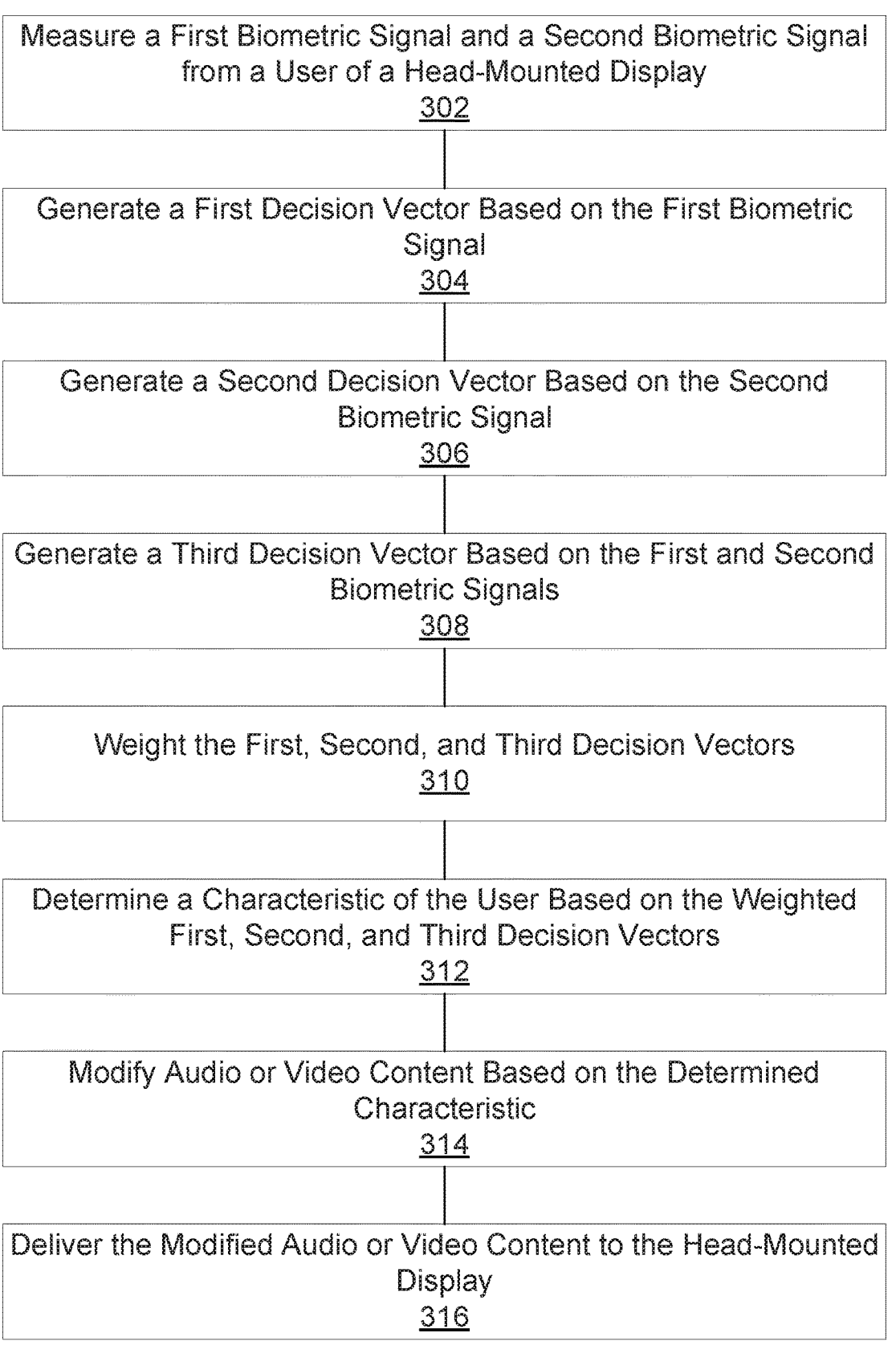

Measure a First Biometric Signal and a Second Biometric Signal
from a User of a Head-Mounted Display
302

Generate a First Decision Vector Based on the First Biometric
Signal
304

Generate a Second Decision Vector Based on the Second
Biometric Signal
306

Generate a Third Decision Vector Based on the First and Second
Biometric Signals
308

Weight the First, Second, and Third Decision Vectors
310

Determine a Characteristic of the User Based on the Weighted
First, Second, and Third Decision Vectors
312

Modify Audio or Video Content Based on the Determined
Characteristic
314

Deliver the Modified Audio or Video Content to the Head-Mounted
Display
316

FIG. 4                                                                                      <u>400</u>

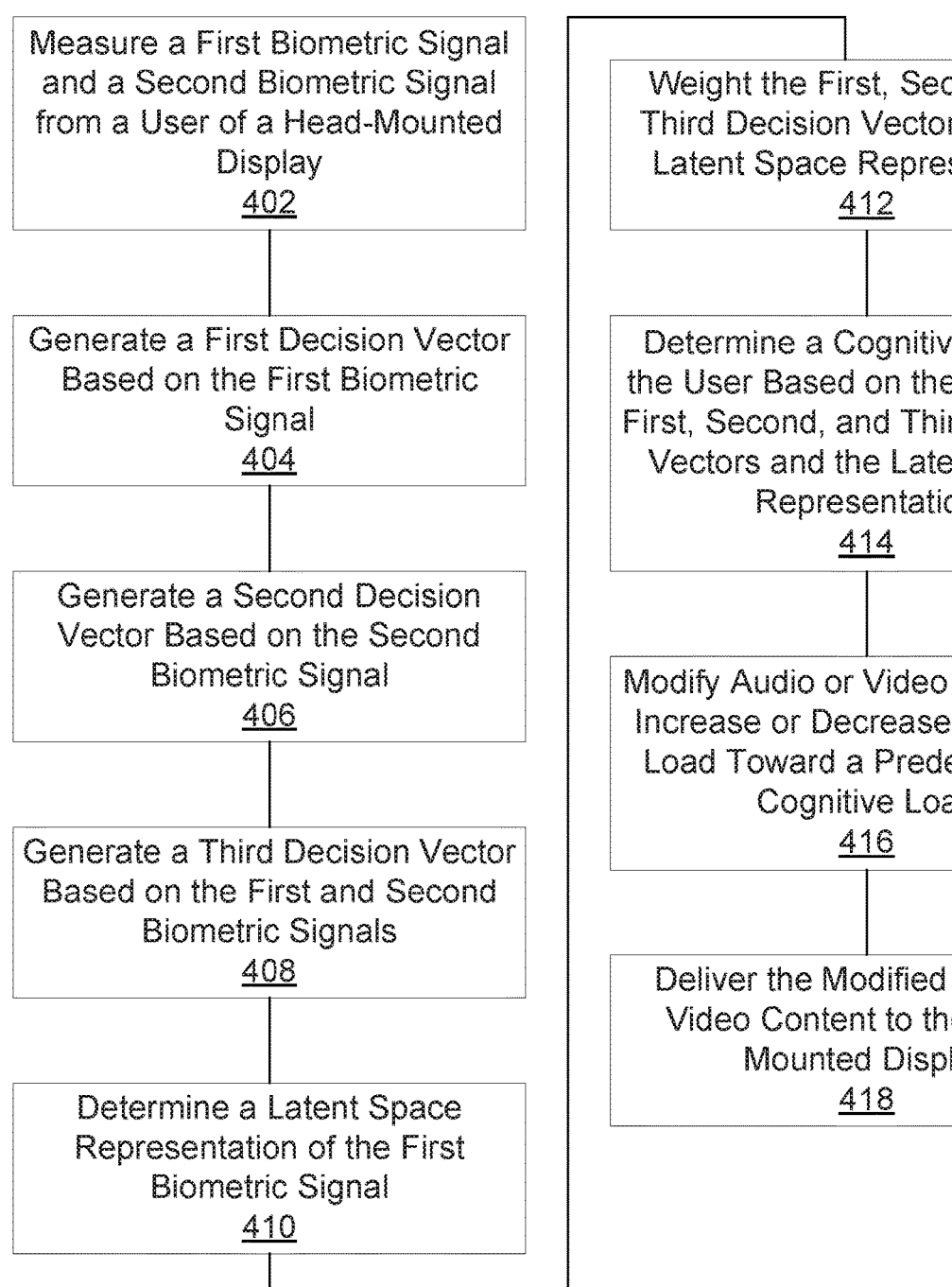

Measure a First Biometric Signal and a Second Biometric Signal from a User of a Head-Mounted Display
<u>402</u>

Generate a First Decision Vector Based on the First Biometric Signal
<u>404</u>

Generate a Second Decision Vector Based on the Second Biometric Signal
<u>406</u>

Generate a Third Decision Vector Based on the First and Second Biometric Signals
<u>408</u>

Determine a Latent Space Representation of the First Biometric Signal
<u>410</u>

Weight the First, Second, and Third Decision Vectors and the Latent Space Representation
<u>412</u>

Determine a Cognitive Load of the User Based on the Weighted First, Second, and Third Decision Vectors and the Latent Space Representation
<u>414</u>

Modify Audio or Video Content to Increase or Decrease Cognitive Load Toward a Predetermined Cognitive Load
<u>416</u>

Deliver the Modified Audio or Video Content to the Head-Mounted Display
<u>418</u>

DETERMINATIONS OF CHARACTERISTICS FROM BIOMETRIC SIGNALS

BACKGROUND

A system may measure biometric signals of a user. For example, the system may include a head mounted display able to produce a virtual reality (VR) experience, an augmented reality (AR) experience, a mixed reality (MR) experience, or the like. VR, AR, and MR may be collectively referred to as extended reality (XR). The system may also include controllers, haptic feedback devices, or the like. The system may measure biometric signals from the user. For example, the head mounted display, the controller, or the haptic feedback devices may measure the biometric signals.

BRIEF DESCRIPTION OF THE DRAWINGS

FIG. 3 is a flow diagram of an example method to determine characteristics from biometric signals.

FIG. 4 is a flow diagram of another example method to determine characteristics from biometric signals.

DETAILED DESCRIPTION

Figure 1:
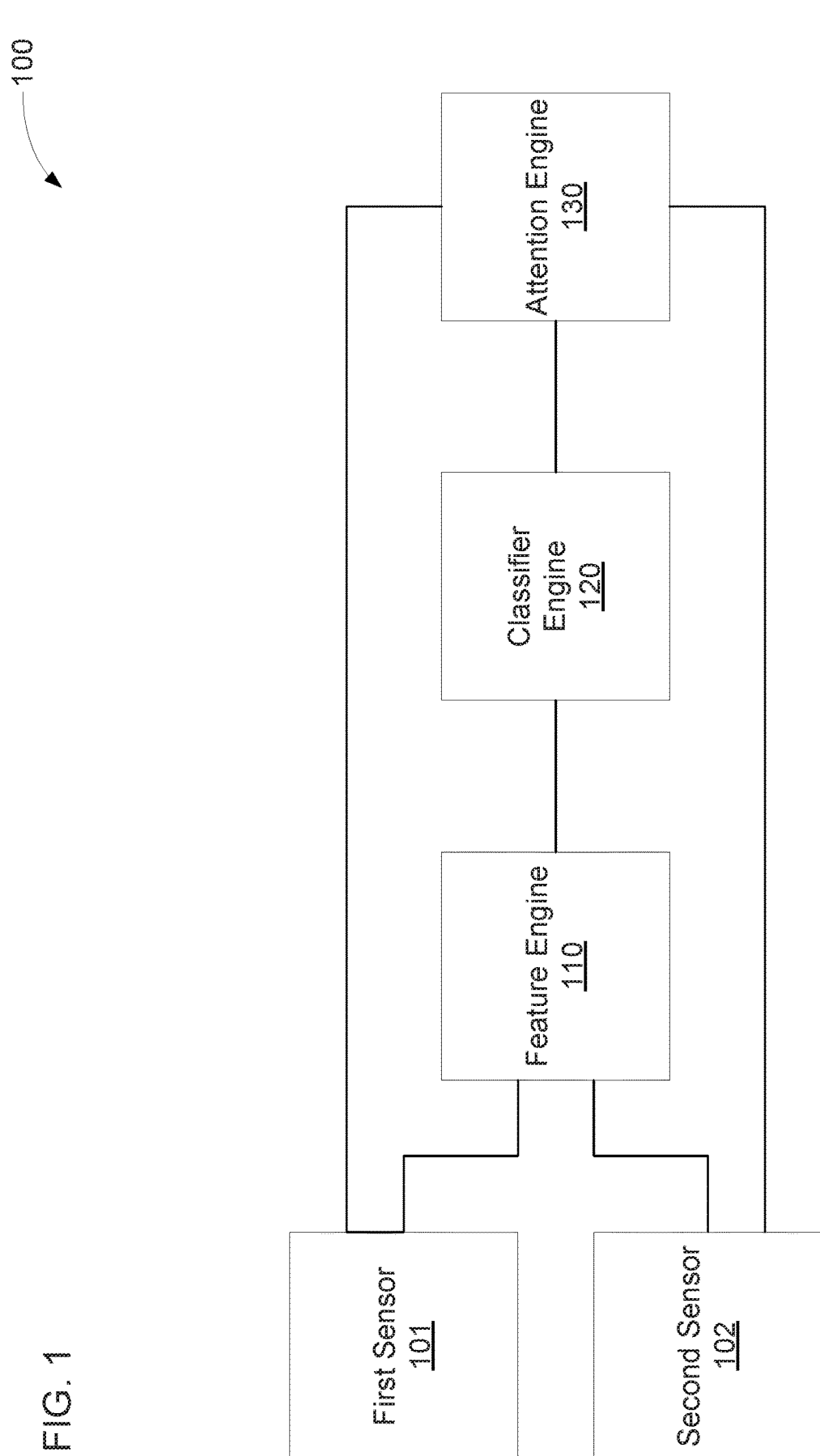
FIG. 1 is a block diagram of an example system to determine characteristics from biometric signals.

A system, such as an XR system, may measure various biometric signals. For example, the biometric signals may be a heart rate signal (e.g., a photoplethysmography (PPG) signal, an electrocardiogram (ECG) signal, etc.), a galvanic skin response signal, a pupillometry signal, an eye tracking signal, an electromyography (EMG) signal, a respiration rate signal, a blood pressure signal, or the like. The various signals may be indicative of a state of a user. The system may adjust a user experience based on the state of the user. For example, the system may detect a cognitive load (e.g., is the user bored, overwhelmed, etc.) of a user and adjust the experience to produce an ideal cognitive load. The system may detect the user's level of change blindness and modify a scene based on the change blindness exceeding a threshold.

A system that receives multiple biometric signals may make a decision about the state of the user based on the multiple signals. For example, the system may fuse the signals to make the decision about the state of the user. There are various ways for the system to fuse the signals. In an example, the system may perform decision level fusion. To perform decision level fusion, the system may combine multiple decisions about the state of the user each made from an individual signal. For example, each signal may be analyzed by a corresponding neural network to make a decision about the state of a user. The decisions may be combined to reach a final decision about the state of the user, for example, by averaging the decisions, selecting a median decision, consulting a lookup table, or the like.

In an example, the system may perform feature level fusion. To perform feature level fusion, the system may convert each signal into a feature vector and combine the feature vectors. The system may make a decision based on the combined feature vectors. For example, a single neural network may make a decision about the state of the user based on the combined feature vectors. The feature vectors for the various signals may be concatenated, and the concatenated vector may be used as an input to the neural network.

Using decision level fusion and feature level fusion may each have disadvantages. When performing decision level fusion, information about correlations among the signals may be lost because the final decisions may be fused without any additional information about the signals and with the signals otherwise processed separately. Accordingly, the final decision may not be as accurate as it could be if the correlations and relationships among the signals were considered. When performing feature level fusion, the decisions may not be robust against signal loss. If a signal goes offline or experiences a temporary disruption, the neural network may be unable to make an accurate decision regarding the state of the user. For example, user movement, blinking, etc. may disrupt measurements by biometric sensors. The biometric sensors may experience with enough frequency that the decision errors may affect the user experience. Accordingly, decisions about the user state could be improved by providing for decisions that leverage the correlations and relationships among multiple signals while being robust to the loss of individual signals.

FIG. 1 is a block diagram of an example system 100 to determine characteristics from biometric signals. The system 100 may include a plurality of biometric sensors, including a first biometric sensor 101 and a second biometric sensor 102. As used herein, the "biometric sensor" refers to a sensor that measures a characteristic of a biological entity, such as a human, that changes based on voluntary or involuntary biological functions of the biological entity. The plurality of biometric sensors may generate a plurality of signals. In some examples, the first biometric sensor 101 may measure a first characteristic of a user of the system 100, and the second biometric sensor 102 may measure a second characteristic of the user different from the first.

The system 100 may include a feature engine 110. As used herein, the term "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware. The feature engine 110 may generate a plurality of feature vectors from the plurality of signals. For example, each vector may include a plurality of values indicative of features in the plurality of signals. The feature vectors may be compressed representations of the signals. The feature engine 110 may generate multiple feature vectors per signal and may use generate the feature vectors in different ways.

The system 100 may include a classifier engine 120. The classifier engine 120 may generate a plurality of decision vectors based on the plurality of feature vectors. The classifier engine 120 may include a machine learning model, such as a neural network, to generate the decision vector. The decision vector may include a plurality of values, and each value may correspond to a possible characteristic of a user. The decision vector may be a vector of soft determinations. As used herein, the term "soft determinations" refer to values indicative of how likely each determination is true. For example, the vector may be a softmax vector with each value in the vector indicative of the probability of the user having the characteristic corresponding to the value.

The system 100 may include an attention engine 130. The attention engine 130 may weight the plurality of feature vectors and the plurality of decision vectors. For example, the attention engine 130 may use a positional attention model to apply weights to each of the decision vectors and to apply weights to the feature vectors or to versions of the feature vectors with reduced dimensionality. The attention engine 130 may also determine a characteristic of a user based on the weighted feature and decision vectors. For example, the attention engine 140 may include a machine learning model, such as a neural network, to determine the characteristic. The machine learning model may have been trained to determine the characteristic based on the weighted decision and feature vectors.

Figure 2:
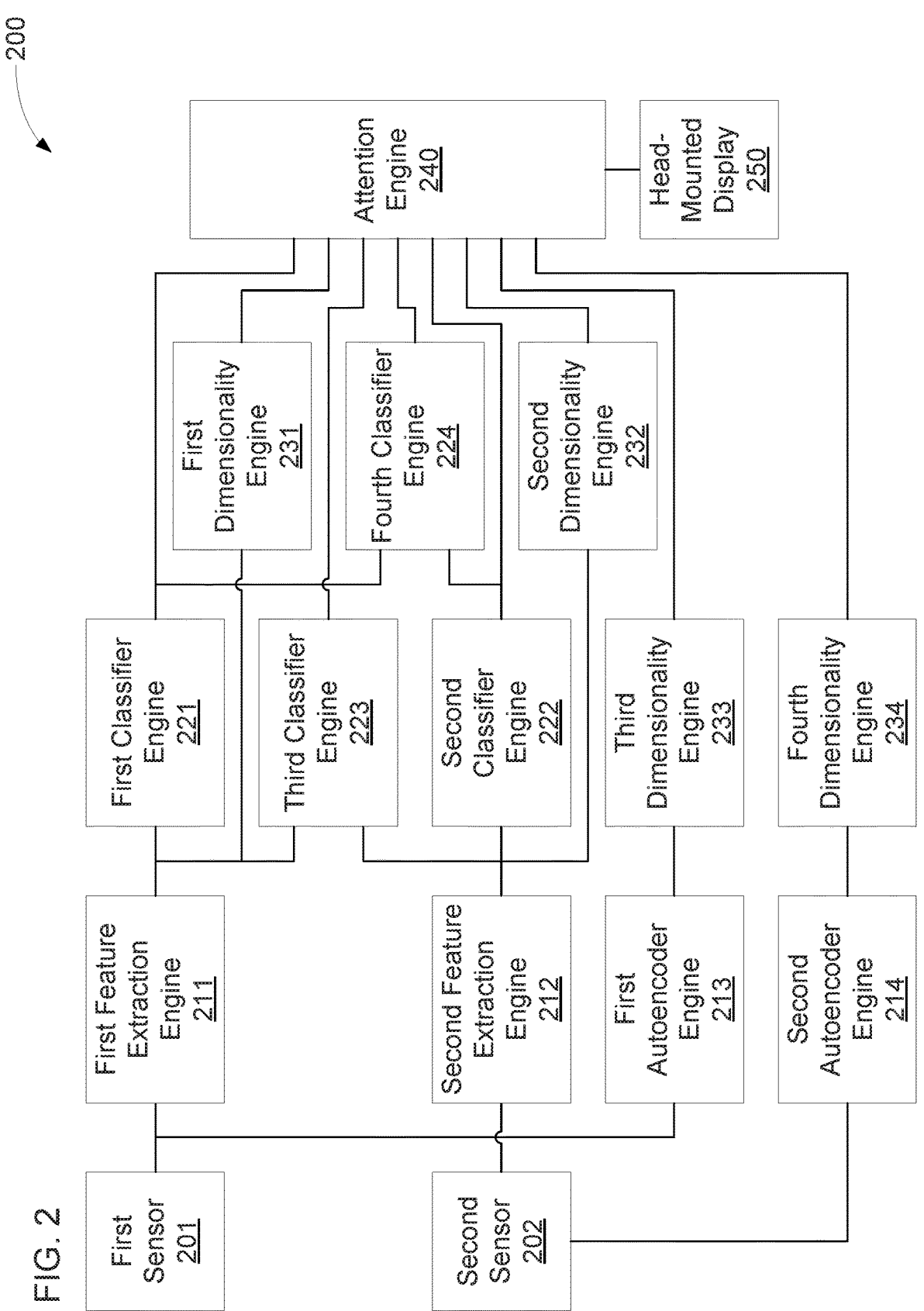
FIG. 2 is a block diagram of another example system to determine characteristics from biometric signals.

FIG. 2 is a block diagram of another example system 200 to determine characteristics from biometric signals. The system 200 may include a plurality of biometric sensors, including a first biometric sensor 201 and a second biometric sensor 202. The sensors 201, 202 may be sensors in a headset, controllers, clothing, a backpack, or the like worn or held by a user of the system. The sensors 201, 202 may measure various characteristics of the user. Each sensor 201, 202 may generate a signal, such as a heart rate signal (e.g., a photoplethysmography (PPG) signal, an electrocardiogram (ECG) signal, etc.), a galvanic skin response signal, a pupillometry signal, an eye tracking signal, an electromyography (EMG) signal, a respiration rate signal, a blood pressure signal, or the like.

The system 200 may include a first feature extraction engine 211, a second feature extraction engine 212, a first autoencoder engine 213, or a second autoencoder engine 214. The first feature extraction engine 211 may generate a first feature vector from a first signal from the first sensor 201, and the first autoencoder engine 213 may generate a second feature vector from the first signal. The second feature extraction engine 212 may generate a third feature vector from a second signal from the second sensor 202, and the second autoencoder engine 214 may generate a fourth feature vector from the second signal. In some examples, the first and second signals may be preprocessed before being provided to the first feature extraction engine 211, the second feature extraction engine 212, the first autoencoder engine 213, or the second autoencoder engine 214. The first and second signals may be non-stationary signals and may be preprocessed to more closely resemble stationary signals. For example, the first and second signals may be converted to a time series, and the first and second signals may have noise removed and may be detrended.

The first and second feature extraction engines 211, 212 may determine feature vectors based on time series generated based on the first and second signals. The first and second feature extraction engines 211, 212 may determine the feature vectors deterministically rather than using machine learning. Various aspects of the signals may be used as features depending on the particular signal. For example, the features may include mean, variation, or the like. The feature extraction engines 211, 212 may convert the signal to the frequency domain and include frequency domain information. For a domain specific signal, the feature extraction engines 211, 212 may calculate a meaningful value for the application. For example, the feature extraction engine 211, 212 may calculate a blinking rate based on an eye tracking or pupillometry signal.

The first and second autoencoder engines 213, 214 may determine feature vectors based on time series generated based on the first and second signals. The first and second autoencoder engines 213, 214 may each include an encoder to generate the feature vectors. For example, the encoder may be a neural network that was trained as part of an encoder-decoder pair to generate a representation of the signal as a feature vector. The encoder-decoder pair may include an encoder trained to generate a compressed, low dimensional representation of the signal that minimizes the reconstruction error when reconstructed by the decoder. In some examples, the reconstruction error may be a mean square error, an absolute error, a maximum error, or the like. The reconstruction error may be based on time domain objectives, frequency domain objectives (e.g., power spectral density in a plurality of frequency ranges), or the like. The first and second autoencoder engines 213, 214 may each include a corresponding encoder but not a decoder despite the use of a decoder to train the encoder. Whereas the first and second feature extraction engines 211, 212 may have been designed by a human to select particular aspects of the signals as features, the first and second autoencoder engines 213, 214 may include encoders trained without explicit human design of which aspects to choose as features.

The system 200 may include a plurality of classifier engines, including a first classifier engine 221, a second classifier engine 222, a third classifier engine 223, or a fourth classifier engine 224. The first classifier engine 221 may generate a first decision vector based on the first feature vector, for example, without generating a decision vector based on the second feature vector. The second classifier engine 222 may generate a second decision vector based on the third feature vector. The third classifier engine 223 may generate a third decision vector based on the first and third feature vectors. The fourth classifier engine 224 may generate a fourth decision vector based on the first and second decision vectors. The classifier engines 221-224 may include various inputs, such as a feature vector, multiple feature vectors, a decision vector, multiple decision vectors, or the like.

In some examples, the classifier engines 221-224 may have been trained to identify a characteristic of the user independent of the other classifier engines 221-224 and independent of the attention engine 240. The classifier engines 221-224 may include machine learning models, such as neural networks, that are trained to identify the characteristics of the user based on examples of various signals/feature vectors corresponding each characteristic. The decision vector output by each classifier engine 221-224 may be a vector of soft determinations. As used herein, the term "soft determinations" refers to values indicative of how likely each determination is true. For example, the decision vector may be a softmax vector with each value in the vector indicative of the probability of the user having the characteristic corresponding to the value.

The system 200 may include a plurality of dimensionality engines, including a first dimensionality engine 231, a second dimensionality engine 232, a third dimensionality engine 233, or a fourth dimensionality engine 234. The dimensionality engines 231-234 may reduce a dimensionality of a feature vector to produce a feature vector with reduced dimensionality. For example, the first dimensionality engine 231 may reduce a dimensionality of the first feature vector, the second dimensionality engine 232 may reduce a dimensionality of the third feature vector, the third dimensionality engine 233 may reduce a dimensionality of the second feature vector, and the fourth dimensionality engine 234 may reduce a dimensionality of the fourth feature vector. In some examples, the dimensionality engines 231-234 may include a machine learning model, such as a neural network. For example, the dimensionality engines 231-234 may include a neural network with a single, linear combination layer to reduce the dimensionality, and the dimensionality engines 231-234 may apply a softmax function to the output of the linear combination layer to produce the feature vector with reduced dimensionality. In the illustrated example, the feature vectors with reduced dimensionality are not provided to a classifier engine 221-224 before or after dimensionality reduction and are processed by the linear combination layer and softmax function without additional processing by a neural network (other than the attention engine 240 discussed below). The dimensionality engines 231-234 may reduce the dimensionality of the feature vectors to be the same size as the decision vectors output from the classifier engines 221-224. The classifier engines 221-224 and dimensionality engines 231-234 may make the vectors the same length to avoid bias or under-representation of any of the vectors.

The system 200 may include an attention engine 240. The attention engine 240 may receive as inputs the decision vectors from the first, second, third, and fourth classifier engines 221-224 and the feature vectors with reduced dimensionality from the first, second, third, and fourth dimensionality engines 231-234. The attention engine 240 may weight the plurality of feature vectors and the plurality of decision vectors. The attention engine 240 may compute the weights by first computing:

$$h_n = Wv_n + b$$

Where $v_n$ is the nth vector of all the vectors received by the attention engine 240 (e.g., the plurality of decision vectors and the plurality of feature vectors with reduced dimensionality), W and b are parameters generated from a training process, and $h_n$ is a scalar. The attention engine 240 may compute the weights by then computing:

$$\alpha_1, \alpha_2, \ldots, \alpha_n = \text{softmax}(h_1, h_2, \ldots, h_n)$$

Where $\alpha_1, \alpha_2, \ldots, \alpha_n$ are the weights to be applied to the vectors received by the attention engine 240. The attention engine 240 may weight and combine the vectors received by the attention engine by computing:

$$c = \sum_{i=1}^{n} \alpha_i v_i$$

Where c is a decision vector resulting from the weighting and combining. In some examples, c is a vector of soft determinations.

The attention engine 240 may determine a characteristic of a user based on the weighted feature and decision vectors. For example, the attention engine 240 may generate a final decision vector, such as the decision vector, c, resulting from the weighting and combining. In some examples, the attention engine 240 may apply a single, linear combination layer of a neural network and a softmax function to the decision vector, c, resulting from the weighting combining to produce the final decision vector. The final decision vector may be a vector with each value in the vector corresponding to a possible state of the characteristic of the user. Each value may be indicative of the probability of the characteristic of the user being in that state. The attention engine 240 may determine the characteristic of the user by determining which vector value is largest and selecting the state corresponding to that vector value.

In examples, the characteristic of the user may be a mental state of the user (e.g., a cognitive load, a perceptual load, etc.), an emotional state of the user, a physical state of the user, or the like. For a system to determine a cognitive load or a perceptual load, the possible states of the characteristic may be a high load, a medium, and a low load or may include more or fewer possible states. For an emotional state of the user, the possible states may include a selected set of emotions (e.g., happy, sad, angry, afraid, bored, etc.). The physical states may include health conditions, physical effort, physical exhaustion, tiredness, stress, etc. For example, the system may be trained to detect particular adverse health conditions. Physical effort, physical exhaustion, tiredness, stress, etc. may be grouped in a predetermined number of buckets, such as high, medium, and low or the like.

The system 200 may include a head-mounted display 250. The system 200 may alter an audio or video output by the head-mounted display 250 based on the determined characteristic of the user. For example, if a cognitive load is too high, the system 200 may alter the audio or video to reduce cognitive load, e.g., by reducing the number or intensity of stimuli in the audio or video. Conversely, if the cognitive load is too low, the system 200 may alter the audio or video to increase the cognitive load. Similarly, if the user is in an undesired emotional or physical state, the system 200 may alter the audio or video in a way predicted to cause the user to reach the desired emotional or physical state. The audio or video may be altered by the head-mounted display 250 or by a separate engine generating the audio or video for rendering by the head-mounted display. The head-mounted display 250 may include display elements to deliver modified video to the user or headphones or speakers to deliver modified audio to the user.

Although a particular combination of classifier engines and dimensionality engines is depicted, various other combinations are contemplated. For example, various combinations of feature extraction engines and autoencoder engines may be included for each signal (e.g., a feature extraction engine without an autoencoder engine, an autoencoder engine without a feature extraction engine, multiple feature extraction engines or multiple autoencoder engines, or the like). Multiple signals may be provided to a particular feature extraction engine or autoencoder engine. There may be various numbers of classifier engines with various inputs, such as decision vectors, feature vectors (feature extraction or autoencoder generated), or combinations thereof. For example, an additional classifier engine could be included that operates on the outputs of the third and fourth classifier engines. There may be classifiers with different models or with the same model with different hyperparameters. For example, a same feature vector or different feature vectors may be provided to a classifier engine with a convolutional neural network model and a classifier engine with a long short-term memory model respectively. The outputs from the models may be provided to an additional classifier engine or to the attention engine 240. Any number of layers (e.g., serially concatenated classifier engines) or models may be included. Dimensionality engines may be included for some or all signals. For example, some feature vectors may be provided to a classifier engine but not a dimensionality engine or vice versa.

The system 200 may perform fusion at various levels. For example, the system 200 may perform feature level fusion and decision level fusion. In some examples, signal level fusion may also be performed. The attention engine 240 may determine how much weight to provide to the results from the various fusions. The system 200 has the benefits of decision level fusion and feature level fusion while mitigating the disadvantages. The system 200 is robust to signal loss while also being able to consider the correlations and relationships among the signals to produce a more accurate result.

FIG. 3 is a flow diagram of an example method 300 to determine characteristics from biometric signals. A processor may perform elements of the method 300. For illustrative purposes, the method 300 is described in connection with the device of FIG. 2. However, other devices may perform the method in other examples. At block 302, the method 300 may include measuring a first biometric signal and a second biometric signal from a user of a head-mounted display. For example, the first and second sensors 201, 202 may measure the first and second biometric signals in any of the manners previously discussed.

Block 304 may include generating a first decision vector based on the first biometric signal, block 306 may include generating a second decision vector based on the second biometric signal, and block 308 may include generating a third decision vector based on the first and second biometric signals. For example, the first, second, and third classifier engines 221-223 may generate the first, second, and third decision vectors respectively in any of the manners previously discussed.

At block 310, the method 300 may include weighting the first, second, and third decision vectors. At block 312, the method 300 may include determining a characteristic of the user based on the weighted first, second, and third decision vectors. For example, the attention engine 240 may weight the first, second, and third decision vectors and determine the characteristic of the user based on the weighted first, second, and third decision vectors in any of the manners previously discussed.

Block 314 may include modifying audio or video content based on the determined characteristic. For example, the head-mounted display 260 or a separate rendering engine may modify the audio or video content based on the determined characteristic in any of the manners previously discussed. At block 316, the method 300 may include delivering the modified audio or video content to the user of the head-mounted display. For example, the head-mounted display 260 may deliver the modified audio or video content to the user in any of the manners previously discussed.

FIG. 4 is a flow diagram of another example method 400 to determine characteristics from biometric signals. A processor may perform elements of the method 400. For illustrative purposes, the method 400 is described in connection with the device of FIG. 2. However, other devices may perform the method in other examples. Block 402 may include measuring a first biometric signal and a second biometric signal from a user of a head-mounted display. For example, the first and second sensors 201, 202 may measure the first and second biometric signals in any of the manners previously discussed.

Block 404 may include generating a first decision vector based on the first biometric signal, block 406 may include generating a second decision vector based on the second biometric signal, and block 408 may include generating a third decision vector based on the first and second biometric signals. For example, the first, second, and third classifier engines 221-223 may generate the first, second, and third decision vectors respectively in any of the manners previously discussed.

At block 410, the method 400 may include determining a latent space representation of the first biometric signal. For example, the first autoencoder engine 213 and the third dimensionality engine 233 may determine the latent space representation of the first biometric signal in any of the manners previously discussed. In some examples, the autoencoder may generate the latent space representation directly without the dimensionality engine, or a machine learning model, such as a neural network, other than an autoencoder may generate the machine learning model.

Block 412 may include weighting the first, second, and third decision vectors and the latent space representation. Block 412 may include weighting each of the first, second, and third decision vectors and the latent space representation based on the values of that vector. For example, the attention engine 240 may weight the first, second, and third decision vectors and the latent space representation in any of the manners previously discussed.

At block 414, the method 400 may include determining a characteristic, such as a cognitive load, of the user based on the weighted first, second, and third decision vectors and the weighted latent space representation. For example, the attention engine 240 may determine the cognitive load of the user based on the weighted first, second, and third decision vectors and the weighted latent space representation in any of the manners previously discussed.

Block 416 may include modifying audio or video content based on the determined characteristic, for example, to cause an increase or decrease in the cognitive load of the user toward a predetermined cognitive load. The head-mounted display 250 or a separate rendering engine may modify the audio or video content to cause the increase or decrease in the cognitive load of the user toward the predetermined cognitive load in any of the manners previously discussed. At block 418, the method 400 may include delivering the modified audio or video content to the user of the head-mounted display 250. For example, the head-mounted display 250 may deliver the modified audio or video content to the user in any of the manners previously discussed.

Figure 5:
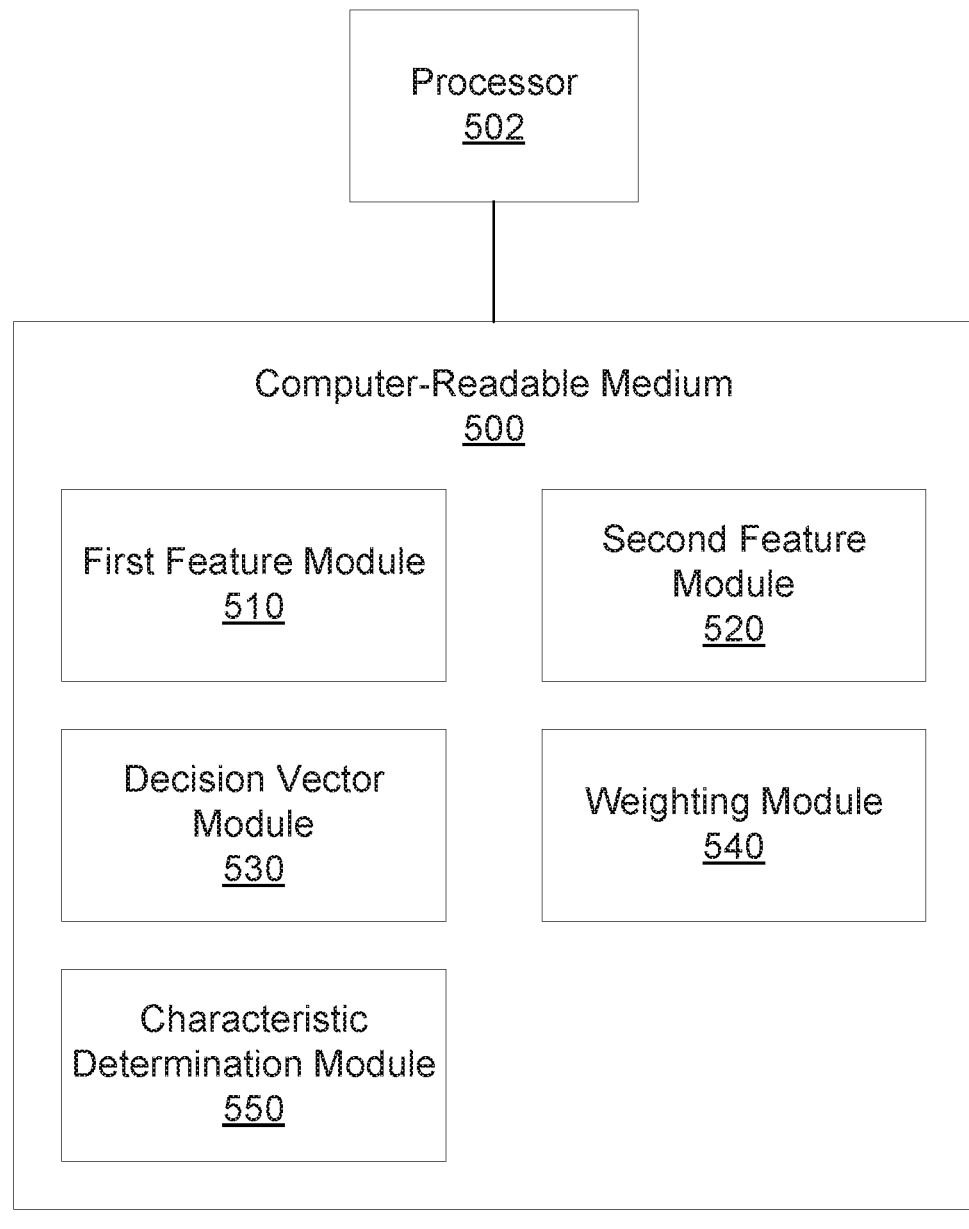
FIG. 5 is a block diagram of an example computer-readable medium including instructions that cause a processor to determine characteristics from biometric signals.

FIG. 5 is a block diagram of an example computer-readable medium 500 including instructions that, when executed by a processor 502, cause the processor 502 to determine characteristics from biometric signals. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include a first feature module 510, a second feature module 520, a decision vector module 530, a weighting module 540, and a characteristic determination module 550. As used herein, a "module" (in some examples referred to as a "software module")

is a set of instructions that when executed or interpreted by a processor or stored at a processor-readable medium realizes a component or performs a method. The first feature module 510 may include instructions that, when executed, cause the processor 502 to generate a first feature vector based on a first biometric signal. The second feature module 520 may cause the processor 502 to generate a second feature vector based on a second biometric signal. In some examples, the first feature module 510 may implement the first feature extraction engine 211 when executed and may generate the first feature vector based on the first biometric signal in any of the manners previously discussed. The second feature module 520 may implement the second feature extraction engine 212 or the second autoencoder engine 214 when executed and may generate the second feature vector based on the second biometric signal in any of the manners previously discussed.

The decision vector module 530 may cause the processor 502 to compute a decision vector based on the first feature vector using a classifier. For example, the decision vector module 530 may implement the first classifier engine 221 when executed and may compute the decision vector based on the first feature vector using the classifier in any of the manners previously discussed.

The weighting module 540 may cause the processor 502 to calculate a first weighted vector based on the decision vector and a second weighted vector based on the second feature vector. The characteristic determination module 550 may cause the processor 502 to determine a characteristic of a user based on the first and second weighted vectors. For example, the weighting module 540 and the characteristic determination module 550 may implement the attention engine 240 when executed. The weighting module 540 may cause the processor 502 to calculate the first weighted vector based on the decision vector and the second weighted vector based on the second feature vector in any of the manners previously discussed, and the characteristic determination module 550 may cause the processor 502 to determine the characteristic of the user based on the first and second weighted vectors in any of the manners previously discussed.

Figure 6:
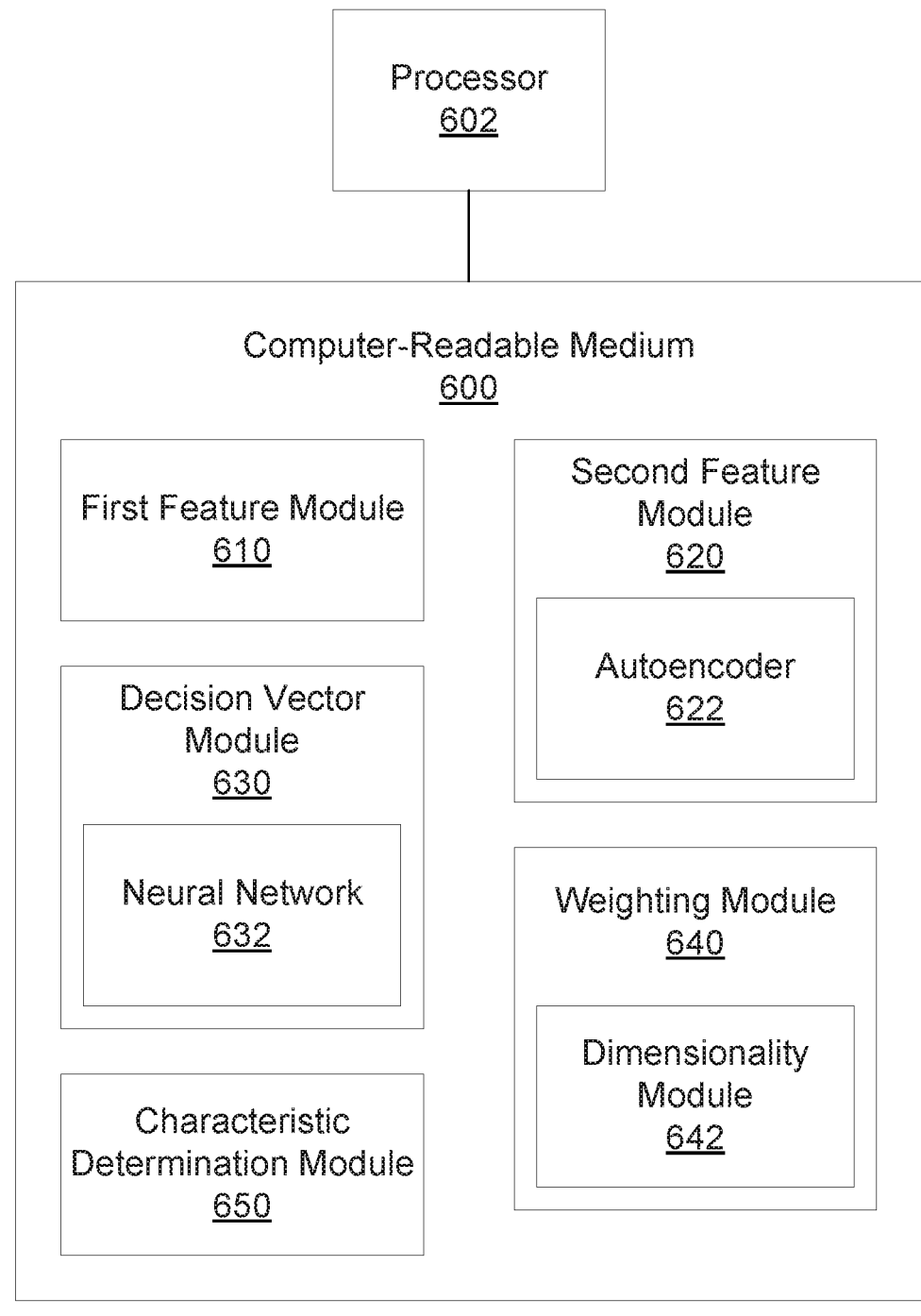
FIG. 6 is a block diagram of another example computer-readable medium including instructions that cause a processor to determine characteristics from biometric signals.

FIG. 6 is a block diagram of another example computer-readable medium 600 including instructions that, when executed by a processor 602, cause the processor 602 to determine characteristics from biometric signals. The computer-readable medium 600 may include a first feature module 610, a second feature module 620, an autoencoder 622, a decision vector module 630, a neural network 632, a weighting module 640, a dimensionality module 642, and a characteristic determination module 650. The first feature module 610 may include instructions that, when executed, cause the processor 602 to generate a first feature vector based on a first biometric signal. For example, the first feature module 610 may implement the first feature extraction engine 211 when executed and may generate the first feature vector based on the first biometric signal in any of the manners previously discussed.

The second feature module 620 may cause the processor 602 to generate a second feature vector based on a second biometric signal. The second feature module 620 may include an autoencoder 622 (e.g., an autoencoder model). The second feature module 620 may cause the processor 602 to use the autoencoder 622 to generate the second feature vector based on the second biometric signal. For example, the second feature module 620 and autoencoder 622 may implement the second autoencoder engine 214 when executed and may use the autoencoder 622 to generate the second feature vector based on the second biometric signal in any of the manners previously discussed.

The decision vector module 630 may cause the processor 602 to compute a first decision vector based on the first feature vector using a classifier. The decision vector module 630 may include a neural network 632 (e.g., a model of a neural network). In various examples, the decision vector module 630 may cause the processor 602 to any of various numbers of decision vectors. For example, the decision vector module 630 may cause the processor 602 to compute a first decision vector using a first neural network with a first architecture and a second decision vector using a second neural network with a second architecture different from the first architecture. The decision vector module 630 may cause the processor 602 to compute the first and second decision vectors based on the first feature vector, based on the first and second feature vectors respectively, or the like. In some examples, the decision vector module 630 may cause the processor 602 to compute a first decision vector based on the first feature vector, compute a second decision vector based on the second feature vector, compute a third decision vector based on the first feature vector and the second feature vector, and compute a fourth decision vector based on the first decision vector and the second decision vector. The decision vector module 630 may implement the first, second, third, or fourth classifier engines 221-224 and may compute the decision vectors in any of the manners previously discussed.

The weighting module 640 may cause the processor 602 to calculate a first weighted vector based on the decision vector and a second weighted vector based on the second feature vector. In some examples, the weighting module 640 may include a dimensionality module 642. The dimensionality module 642 may cause the processor 602 to calculate a reduced dimensionality vector from the second feature vector, and the weighting module 640 may cause the processor 602 to apply a weight to the reduced dimensionality vector. For example, the dimensionality module 642 may implement the first, second, third, or fourth dimensionality engines 231-234 when executed and may calculate a reduced dimensionality vector in any of the manners previously discussed. The weighting module 640 may implement the attention engine 240 when executed and may calculate the weighted decision and feature vectors in any of the manners previously discussed.

The number of vectors weighted by the weighting module 640 may depend on the number of feature and decision vectors received from the feature modules 610, 620 and the decision vector module 630. In the above example with first and second feature vectors and first and second decision vectors, the weighting module 640 may cause the processor 602 calculate a first weighted vector based on the first decision vector, a second weighted vector based on the second feature vector (e.g., based on a reduced dimensionality version of the second feature vector), a third weighted vector based on the second decision vector. The weighting module 640 may also cause the processor 602 to calculate a fourth weighted vector based on the first feature vector (e.g., based on a reduced dimensionality version of the second feature vector). In the above example with first and second feature vectors and first, second, third, and fourth decision vectors, the weighting module 640 may cause the processor 602 calculate a first weighted vector based on the first decision vector, a second weighted vector based on the second feature vector (e.g., based on a reduced dimensionality version of the second feature vector), a third weighted vector based on the second decision vector, a fourth weighted vector based on the third decision vector, and a fifth weighted vector based on the fourth decision vector. The weighting module 640 may also cause the processor 602 to calculate a sixth weighted vector based on the first feature vector (e.g., based on a reduced dimensionality version of the second feature vector).

The characteristic determination module 650 may cause the processor 602 to determine a characteristic of a user based on the first and second weighted vectors. For example, the characteristic determination module 650 may implement the attention engine 240 when executed and may determine the characteristic of the user based on the first and second weighted vectors in any of the manners previously discussed. The characteristic determination module 650 may cause the processor 602 to combine any number of weighted vectors, for example, depending on how many are generated by the weighting module 640 and to determine the characteristic from the combined weighted vectors in any of the manners previously discussed. For example, the characteristic determination module 650 may cause the processor 602 to determine the characteristic based on first and second weighted vectors, first, second, and third weighted vectors, first, second, third, and fourth weighted vectors, first, second, third, fourth, and fifth weighted vectors, first, second, third, fourth, fifth, and sixth weighted vectors, or the like.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
a plurality of biometric sensors to generate a plurality of signals;
a feature engine to generate a plurality of feature vectors from the plurality of signals the plurality of feature vectors including a first feature vector and a second feature vector;
a classifier engine to generate a plurality of decision vectors based on the plurality of feature vectors, the plurality of decision vectors including a first decision vector based on the first feature vector, a second decision vector based on the second feature vector, and a third decision vector based on the first feature vector and the second feature vector;
an attention engine to:
weight the plurality of feature vectors and the plurality of decision vectors; and
determine a characteristic of a user based on the weighted feature and decision vectors; and
a head-mounted display, wherein the system is to alter an audio or video output by the head-mounted display based on the determined characteristic of the user.

2. The system of claim 1, wherein the feature engine includes a feature extraction engine to generate the first feature vector from a first signal and an autoencoder engine to generate the second feature vector from the first signal.

3. The system of claim 2, wherein the classifier engine is to generate the first decision vector based on the first feature vector without generating the first decision vector based on the second feature vector.

4. The system of claim 1, further comprising a dimensionality engine to reduce a dimensionality of a feature vector to produce a feature vector with reduced dimensionality, wherein the attention engine is to weight the feature vector with reduced dimensionality.

5. The system of claim 1, wherein the characteristic of the user comprises a mental state of the user, an emotional state of the user, or a physical state of the user.

6. The system of claim 1, further comprising a rendering engine to alter the audio or video output by the head-mounted display based on the determined characteristic of the user.

7. The system of claim 1, wherein the attention engine includes a machine learning model to determine the characteristic of the user based on the weighted feature and decision vectors.

8. The system of claim 1, further comprising an autoencoder engine to determine a latent space representation of a first signal of the plurality of signals, and wherein the classifier engine is to weight the latent space representation, and determine the characteristic of the user based on the weighted feature and decision vectors and the weighted latent space representation.

9. A method, comprising:
measuring a first biometric signal and a second biometric signal from a user of a head-mounted display;
generating a first decision vector based on the first biometric signal;
generating a second decision vector based on the second biometric signal;
generating a third decision vector based on the first and second biometric signals;
weighting the first, second, and third decision vectors;
determining a characteristic of the user based on the weighted first, second, and third decision vectors;
modifying audio or video content based on the determined characteristic; and
delivering the modified audio or video content to the user of the head-mounted display.

10. The method of claim 9, wherein determining the characteristic of the user includes determining a cognitive load of the user.

11. The method of claim 10, wherein modifying the audio or video content comprises modifying the audio or video content to cause an increase or decrease in the cognitive load of the user toward a predetermined cognitive load.

12. The method of claim 9, further comprising determining a latent space representation of the first biometric signal, and weighting the latent space representation, wherein determining the characteristic comprises determining the characteristic based on the weighted latent space representation.

13. The method of claim 9, wherein weighting the first, second, and third decision vectors comprises weighting each of the first, second, and third decision vectors based on values of that vector.

14. A non-transitory computer-readable medium comprising instructions that, when executed by a processor, cause the processor to:
generate a first feature vector based on a first biometric signal;
generate a second feature vector based on a second biometric signal;
compute a first decision vector based on the first feature vector;
compute a second decision vector based on the second feature vector;
compute a third decision vector based on the first feature vector and the second feature vector;
calculate a first weighted vector based on the first decision vector, a second weighted vector based on the second feature vector, and a third weighted vector based on the third decision vector;

determine a characteristic of a user based on the first, second, and third weighted vectors; and alter an audio or video output of a head-mounted display based on the determined characteristic of the user.

15. The computer-readable medium of claim 14, wherein the instructions to generate the second feature vector include instructions to cause the processor to use an autoencoder to generate the second feature vector based on the second biometric signal, and wherein the instructions to calculate the second weighted vector include instructions to cause the processor to calculate a reduced dimensionality vector from the second feature vector and apply a weight to the reduced dimensionality vector.

16. The computer-readable medium of claim 14, wherein the instructions to compute the decision vector include instructions to cause the processor to compute a first decision vector based on the first feature vector, compute a second decision vector based on the second feature vector, compute a third decision vector based on the first feature vector and the second feature vector, and compute a fourth decision vector based on the first decision vector and the second decision vector.

17. The computer-readable medium of claim 16, wherein the instructions to calculate the first weighted vector include instructions to cause the processor to calculate the first weighted vector based on the first decision vector, wherein the computer-readable medium further comprises instructions to cause the processor to calculate a third weighted vector based on the second decision vector, calculate a fourth weighted vector based on the third decision vector, and calculate a fifth weighted vector based on the fourth decision vector, and wherein the instructions to determine the characteristic of the user include instructions to cause the processor to determine the characteristic based on the first, second, third, fourth, and fifth weighted vectors.

18. The computer-readable medium of claim 14, wherein the instructions to compute the decision vector include instructions to cause the processor to compute a first decision vector using a first neural network with a first architecture and a second decision vector using a second neural network with a second architecture different from the first architecture, wherein the instructions to calculate the first weighted vector include instructions to cause the processor to calculate the first weighted vector based on the first decision vector, wherein the computer-readable medium further comprises instructions to cause the processor to calculate a third weighted vector based on the second decision vector, and wherein the instructions to determine the characteristic of the user include instructions to cause the processor to determine the characteristic based on the first, second, and third weighted vectors.

\* \* \* \* \*